United States Patent [19]

Fukushima

[11] Patent Number: 4,933,985
[45] Date of Patent: Jun. 12, 1990

[54] ROTATION DRIVE DEVICE

[75] Inventor: Nobuo Fukushima, Kanagawa, Japan

[73] Assignee: Canon Kabushiki Kaisha, Tokyo, Japan

[21] Appl. No.: 51,041

[22] Filed: May 15, 1987

[30] Foreign Application Priority Data

| May 21, 1986 | [JP] | Japan | 61-114922 |
| May 21, 1986 | [JP] | Japan | 61-114923 |
| May 21, 1986 | [JP] | Japan | 61-114924 |
| May 21, 1986 | [JP] | Japan | 61-114925 |
| May 21, 1986 | [JP] | Japan | 61-114926 |
| May 21, 1986 | [JP] | Japan | 61-114927 |

[51] Int. Cl.$^5$ .............................................. H02P 5/00
[52] U.S. Cl. ................................... 388/813; 388/812; 388/810; 388/912; 318/608
[58] Field of Search ............... 318/311, 312, 314, 326, 318/327, 603, 608, 68, 69, 70, 632; 388/800-802, 809-814, 912

[56] References Cited

U.S. PATENT DOCUMENTS

| 4,254,367 | 3/1981 | Sakamoto | 318/314 |
| 4,259,698 | 3/1981 | Takada | 318/314 |
| 4,283,671 | 8/1981 | Nakano et al. | 318/314 |
| 4,287,458 | 9/1981 | Nakamura et al. | 318/314 |
| 4,301,395 | 11/1981 | Furuhata | 318/314 |
| 4,418,307 | 11/1983 | Hoffman et al. | 318/314 |
| 4,564,795 | 1/1986 | Parkes et al. | 318/314 |
| 4,658,191 | 4/1987 | Okita et al. | 318/314 |

Primary Examiner—William M. Shoop, Jr.
Assistant Examiner—David Martin
Attorney, Agent, or Firm—Robin, Blecker, Daley & Driscoll

[57] ABSTRACT

A rotation drive device for driving a rotator is disclosed, comprising an electric motor for driving the rotator, a phase detecting circuit for detecting the phase of rotation of the rotator, a reference signal source for forming a reference signal of a constant period, a phase control circuit for controlling the motor in such a manner that the phase difference between the output of the reference signal source and the output of the phase detecting circuit becomes a constant value, a detecting circuit for detecting a fact that the reading-out of the phase difference is not completed in the time interval between the successive two outputs of the phase detecting circuit, a control circuit for varying the number of cycles of phase difference computing operation of the phase control circuit depending on the time interval between the successive two outputs of the phase detecting circuit, another detecting circuit for detecting a fact that the phase detecting circuit has produced no output in one period of the reference signal, and another detecting circuit for detecting a fact that the production of an output of the phase detecting circuit has repeated a plurality of times in one period of the reference signal.

43 Claims, 5 Drawing Sheets

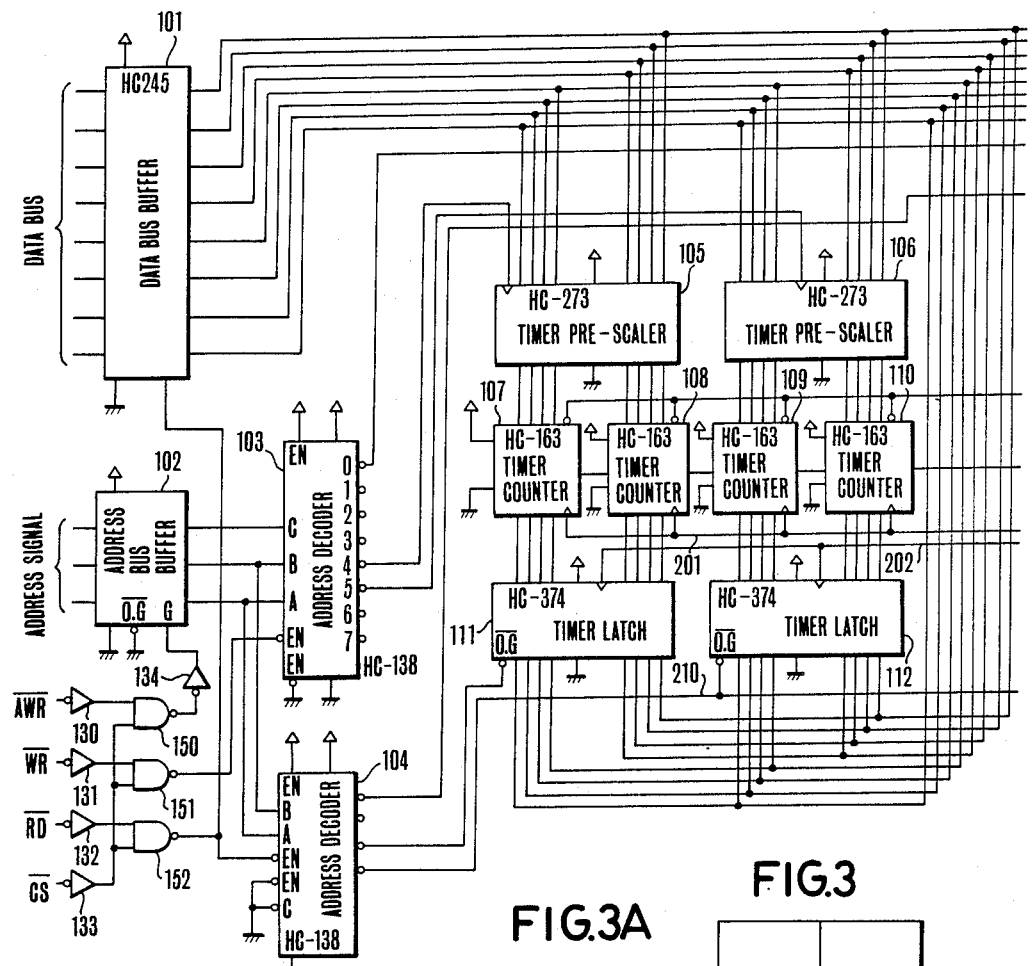
FIG.3A
FIG.3
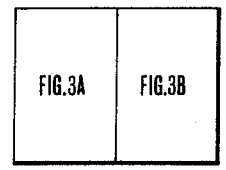

ROTATION DRIVE DEVICE

BACKGROUND OF THE INVENTION

1. Field of the Invention

This invention relates to rotator drive devices, and more particularly to a phase control device for a rotator.

2. Description of the Prior Art

In the conventional rotator drive device. for example, the disk drive device in the electronic still camera, it has been the common practice to control driving of the disk in such a manner that the phase of rotation of the electric motor is brought into coincidence with the clock signal which is used for regulating the timing in operating the camera whole. The use of such a method in controlling the speed (phase) of the motor, therefore, took a very long time. Thus, in the various operations of the camera, its ramp characteristic was less than desirable.

Also, a method of phase control may be considered in which the phase of an FG (Frequency Generator) pulse is synchronized in a delay of $\pi$ from the clock signal. In this case, however, the possibility of controlling the phase is unavoidably limited so that the phase lag of the FG pulses with respect to the clock signal must fall in a range from 0 to not more than $2\pi$.

Yet, with a sudden change of the load on the motor, that the phase difference may likely exceed the above-defined maximum acceptable range.

For example, suppose, for every one revolution of the rotator (nct shown), 16 FG pulses are obtained. If in this case, as the phase difference between the clock sigral and the FG pulse was in the close neighborhood of $(15/8)\pi$ at the time of the $(n-1)$th cycle of sampling for control, the phase of the FG pulse delays more than $(\frac{1}{8})\pi$ from the clock signal until the next or nth cycle of sampling. As a result, a phase lag of the FG pulse to the clock signal above $2\pi$ occurs. In the above-described control method, this situation is mistaken for a diminishment of the phase gap, hecause phase lags of $2\pi$ and zero cannot be discriminated from each other. Therefore, proper control could no longer be attained.

Hence, there has been demand for a rotator drive device having phase control capable of following larger variations and sudden changes in the load.

SUMMARY OF THE INVENTION

With the above-described problems in mind, the present invention has been made, and its object is to provide a rotator drive device which enables an accurate phase control of a rotator to be carried out even when the load varies either to a large extent, or at a high rate.

And, to achieve this object, in an embodiment of the invention, the rotator drive device is constructed with inclusion of rotation drive means for driving a rotator, first detecting means for detecting the phase of rotation of the rotator, a clock signal source for producing a periodical clock signal, phase control means for controlling the rotation drive means in such a manner that the phase difference between the output of the clock signal source and the output of the first detecting means takes a constant value by comparing the phase diffarence with a prescribed value, and second detecting means operating in such a manner that, as it reads out tne phase difference after the first detecting means has produced an output, if the production of another output of the first detecting means occurs before this reading-out operation is performed, this is detected, whereby even when the aforesaid phase control means fails to compute with proper timing the phase control, a correcting measure can be taken by the detection which is obtained from the second detecting means, thereby giving an advantage that the range of phase control is so largely widened that the phase control becomes quickly, reliably and stably responsive even to a rapid, large variation of the load.

Another object of the invention is to provide for the rotator drive device with further inclusion of control means for varying the number of cycles of computing operation of the phase control means depending on the time interval from the moment at which the first detecting means has produced an output to the moment at which the first detecting means produces an output again, so that when the computing is too late, a shift to the next timing occurs, or the present cycle of computing operation is skipped to wait for the next data. Thus, even when a condition not suited to phase control occurs, an appropriate corrective measure can be taken. This makes it possible to widen the range of phase control, and to realize a rotator drive device which can quickly, stably, reliably and accurately cope even with a large variation of the load.

Still another object of the invention is to provide for the rotation drive device with further inclusion of means for detecting that the first detecting means has not produced an output in one period of the clock signal, whereby even when a condition not suited to phase control by the phase control means occurs, a proper measure can be taken with the help of the cutput of the detecting means described just above. Thus, a rotation drive device having a wider range of phaee control and capable, upon variation of the load even to a large extent, of driving the rotator, quickly, reliably and accurately, stably, is realized.

A further object of the invention is to provide for the rotation drive device with further inclusion of control means arranged to cooperate with the detecting means for detecting a fact that the first detecting means has not produced any output in one period of the clock signal in such a manner that if that fact is detected, a speed control is made on the basis of the speed deviation, and after the speed of the aforesaid rotator has been stabilized by that control, a switching to the phase control takes place, whereby even when a condition not suited to phase control is met, it is made possible to cope with it by additionally the speed control. Thus, a rotation drive device having a wider range of phase control and capable, upon variation of the load to a very large extent, of driving the rotator quickly, reliably and accurately, and stably, is realized.

A furthermore object of the invention is to provide for the rotation drive device with further inclusion of detecting means for detecting a fact that the first detecting means has produced a plurality of outputs in time spaced relation in one period of the clock signal, whereby even when a condition not suited to phase control by the phase control means is occurs, it is possible to properly cope with it by utilizing the output of the just above described detecting means. Thus, a rotation drive device having a wider range of phase control and capable, upon variation of the load to a very large extent, of driving a rotator quickly, reliably and accurately, and stably, is realized.

Yet another object of the invention is to provide for the rotation drive device with further inclusion of control means arranged to cooperate with the means for detecting a fact that the first detecting means has produced a plurality of outputs in time spaced relation in one period of the clock signal in such a manner that if that fact is detected, a speed control is made on the basis of the speed deviation, and, after the speed of the rotator has been stabilized by the speed control, a switching to the phase control means takes place. Thus, a rotation drive device having a wider range of phase control and capable, upon variation of the load to a very large extent, of driving the rotator quickly, reliably and accurately, and stably, is realized.

Other objects and features of the invention will become apparent from the following description taken in conjunction with the drawings.

BRIEF DESCRIPTION OF THE DRAWINGS

FIGS. 3, 3A and 3B show an electrical circuit diagram illustrating in detail an example of the construction of the main parts of the device of the invention.

DETAILED DESCRIPTION OF THE PREFERRED EMBODIMENT

The present invention next is described in detail by reference to the drawings.

Figure 1:
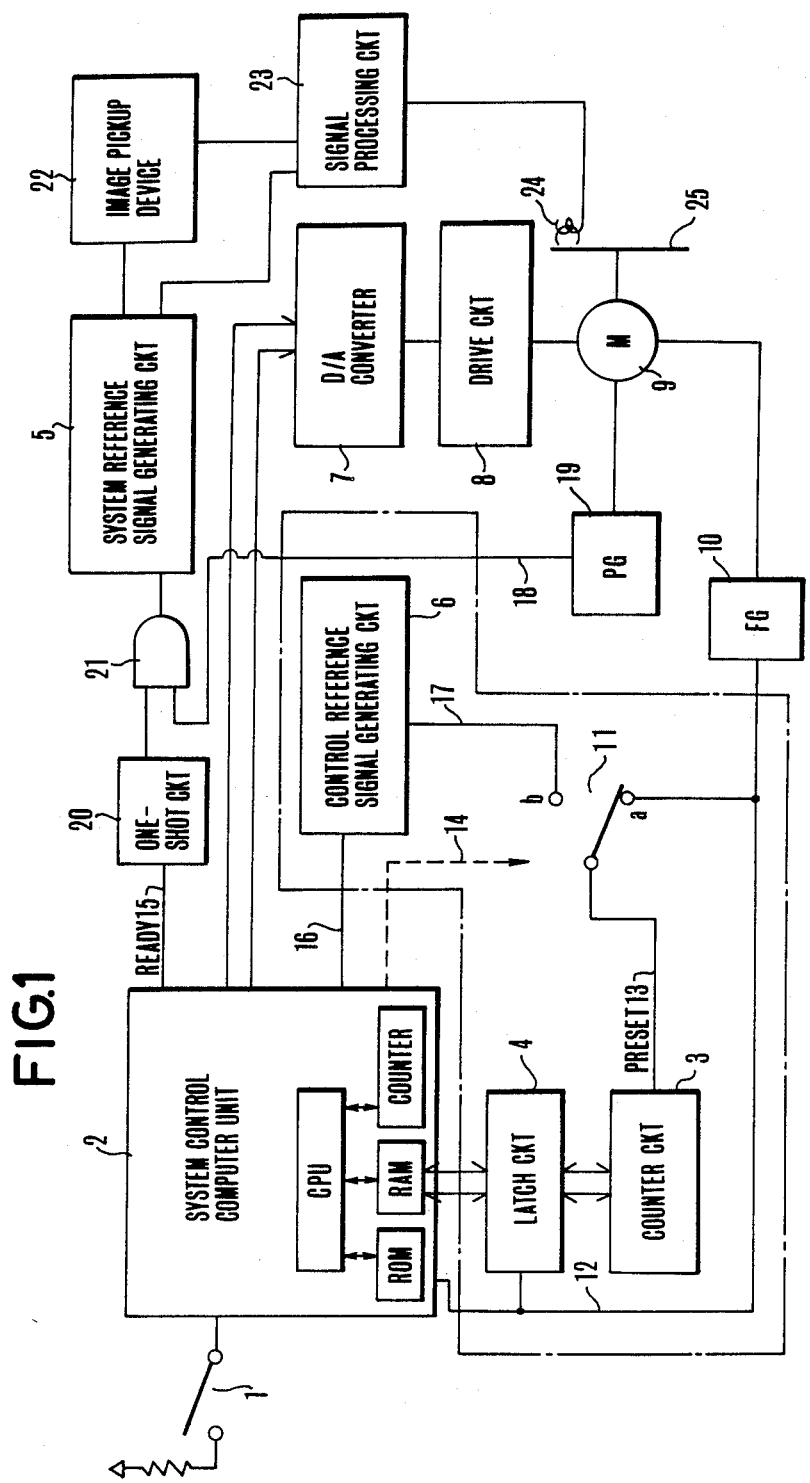
FIG. 1 is a block diagram illustrating an example of the construction of an embodiment of a rotator drive device according to the present invention applied to an electronic still camera.
Figure 2:
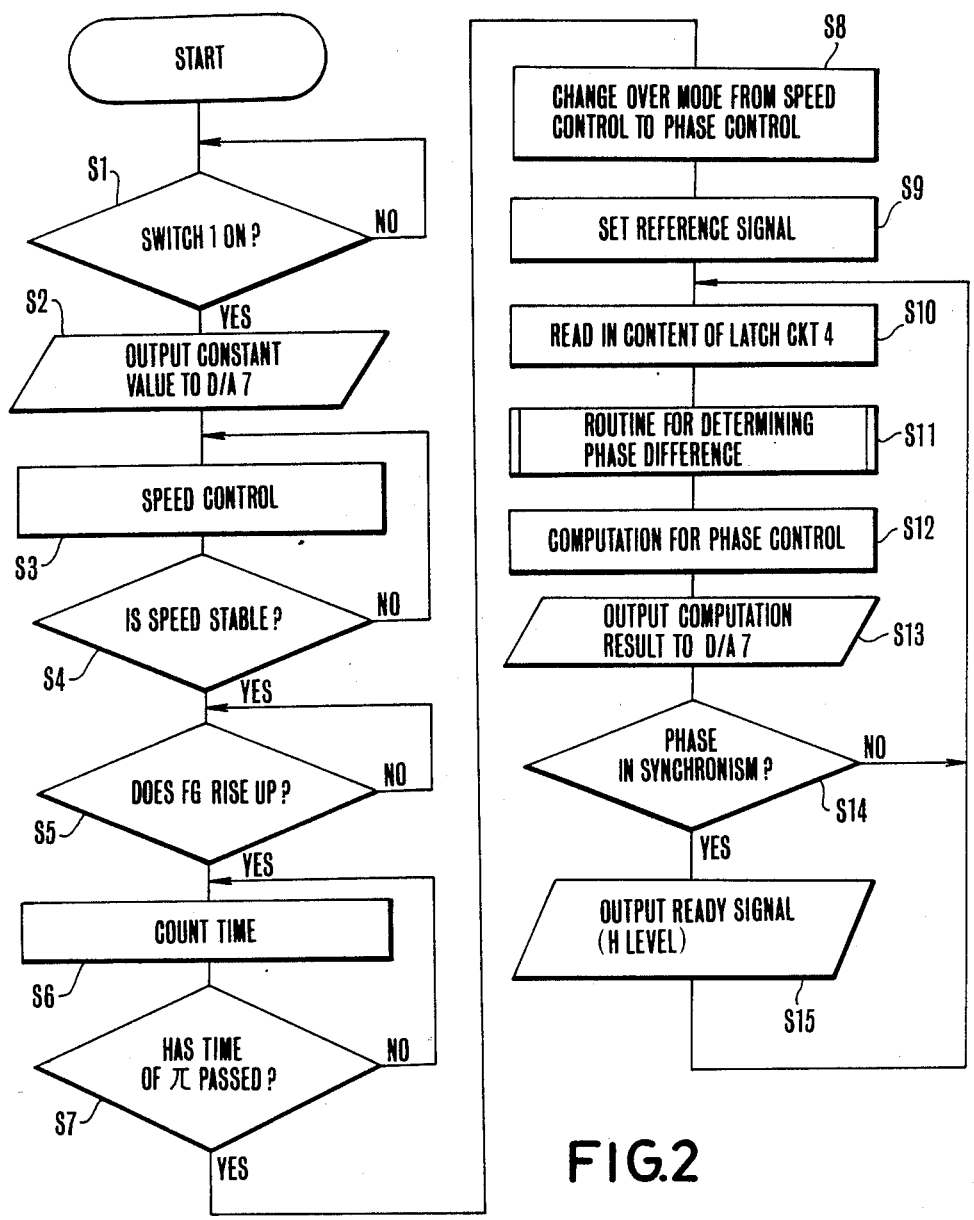
FIG. 2 is a flowchart illustrating an example of a manner in which the device of FIG. 1 operates.

In FIG. 1 there is shown an electronic still camera employing a disk drive device as one embodiment of a rotator drive device. The device includes a motor start switch 1 a system control computer unit 2 for controlling the device whole and performing various computations, the computer unit 2 having a CPU in the form of a microcomputer, a RAM with work areas, a ROM in which a program shown in FIG. 2 is stored, a counter and other components (not shown). The device further includes a timer-counter circuit 3 which is preset at the rising edge of an input (PRESET) signal 13 and counts time from an initial value as a clock signal is produced from a clock oscillator (not shown), a latch circuit 4 for holding the content of the timer-counter circuit 3 at each rising edge of an input signal, the parts 2, 3 and 4 constituting a phase control means, a system reference signal generating circuit 5 as a synchronizing signal source for producing a timing signal (synchronizing signal) for the entirety of the electronic still camera having an electric motor incorporated therein, a motor control reference signal generating circuit 6 as a reference signal source for producing a signal to which the phase control of the motor is referred, a D/A converter 7, a motor drive circuit 8 for amplifying a motor control signal of D/A converted form, and an electric motor 9 as the rotation drive means.

An FG Frequency Generator) circuit 10 as the detecting means produces an FG signal corresponding to the speed of rotation of the motor 9, that is, for example, 16 pulses for every one revolution of the motor 9. A mode selector switch 11 responsive to a mode selection signal 14 moves between its "a" position where the speed is controlled by using the speed deviation, or the speed control mode is set, and its "b" position where the speed is controlled by phase synchronization or the phase control mode is set. A phase signal generator PG produces a pulse of H level for one revolution of the motor in synchronism with the phase of the motor. 21 is an AND gate; 12 is the output signal of the FG circuit 10; 13 is the PRESET signal inputted to the "preset" input terminal of the counter circuit 3; 15 is the READY signal produced from the computer unit 2 and having H level when in phase synchronism or L level when out of synchronism; 16 is the reference signal generation timing signal produced from the computer unit 2; 17 is the reference signal produced from the control reference signal generating circuit 6; 18 is the output signal from the PG 19. A one-shot circuit 20 produces one pulse of H level whose width is almost equal to the period of the output signal of the PG when the READY signal 15 changes from L level to H level. 22 is an image pickup device; 23 is a signal processing circuit; 24 is a head; 25 is a recording medium as the rotator whose rotation is to be controlled.

Next, the operation of the device of FIG. 1 is described.

FIG. 2 illustrates a process for controlling the driving of the rotator according to the embodiment of the invention. In this embodiment, the motor 9 is synchronized with the vertical synchronizing signal of the video signal, and when their phases are in synchronism, the period of the FG signal 12 of the motor 9 is made equal to the period of the reference signal 17 from the control reference signal generating circuit 6, and the phase difference between the rising pulse edge of the FG signal and the rising edge of the reference signal 17 is made equal to $\pi$. Here, the reason why the phase difference is taken at $\pi$ is that the phase difference to be detected is allowed to vary over a widest possible range, when it is taken at $\frac{1}{2}$ of one resolution or $2\pi$.

At a time when the start begins, the motor 9 is assumed to be stopping from rotation. At this initial time, the switch 11 is in its "a" position, that is, the speed control mode is set. Now, a step S1 is executed. If the motor start switch 1 is closed, then the operation advance to a step S2 so that the system control computer unit 2 gives the D/A converter 7 an output of a constant value large enough to drive the motor 9.

Then the operation advances to a step S3. After the speed of the motor 9 has been controlled in the following manner in the step S3, a step S4 follows in the computer unit 2 to examine whether or not motor speed is stable. That is, at first, in the step S3, the signal from the D/A converter 7 is inputted to the drive circuit 8, and the signal based on this from the drive circuit 8 is supplied to the motor 9. The motor 9 then starts to rotate. The FG circuit 10 produces an FG pulse signal 12 proportional to the period of rotation of the motor 9. Here, since the switch 11 is in the "a" position, the content of the timer-counter circuit 3 is sampled and held in the latch circuit 4 in synchronism with the rising edge of the FG pulse signal 12. At the same time, the timer-counter circuit 3 is preset and starts to count time from the ini&ial value again. That is, the latch circuit 4 holds the period of the FG pulse in every one rising edge of the FG pulse signal. The computer unit 2 computes the difference between the held period of the FG pulse and the control target period (or, in the case of, for example, NTSC system, the period of the vertical synchronizing signal (1/60)sec./the number of FG pulses in one revolution (16)) as the amount of deviation, and produces an output representing the amount of adjustment of the speed which is then applied ro the D/A converter 7. In such a manner, the speed of the motor 9 is controlled.

Then the operation advances to a step S4 in which whether or not the speed of the motor 9 is sufficiently stable in the neighborhood of the target speed is tested in the computer unit 2 based on the aforesaid amount of deviation. If the amount of deviation is larger than a prescribed value, indicating that the speed is unstable, then the operation returns to the step S3. If within the prescribed value, as the speed is stable, then the operation advances to a step S5.

In the step S5, whether or not the FG pulse is at the rising edge is tested in the computer unit 2. If it is determined "yes", then the operation advances to a step S6 in which the computer unit 2 performs timing counting from the point in time of the rising edge of the FG pulse by a counter incorporated therein. Then the operation advances to a step S7 in which whether or not a time equal to ½ of the period of the FG pulse when in synchronism, namely, $\pi$ from the start of the counting has passed is determined in the computer unit 2. If "yes", then the operation advances to a step S8.

In the step S8, the computer unit 2 moves the switch 11 to the phase control mode position or "b" position. In the next step S9, the reference signal generation timing signal 16 from the computer unit 2 is applied to the control reference signal generating circuit 6. At a point in time when the time of $\pi$ from the rise of the FG pulse has passed in the computar unit 2, the generating circuit 6 starts to produce the reference signal 17.

Figure 4:
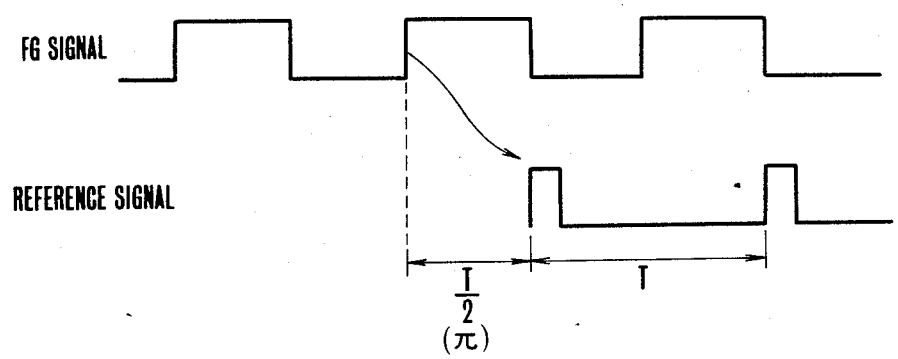
FIGS. 4 and 5 are timing charts illustrating two examples of the timing of the FG pulse signal with a clock signal.

FIG. 4 illustrates the timing of the FG signal and the reference signal at this time. Thereby, the counter circuit 3 when in the phase control mode is reset each time the output signal of the control reference signal generating circuit 6 rises up.

In a step S10, the computer unit 2 reads in the content of the latch circuit 4. The content of the latch circuit 4 is the counted value of the time from the rising edge of the reference signal 17 to the rising edge of the FG pulse. This represents the phase difference between the reference signal and the FG pulse signal.

In the next step Sll, a routine for determining the phase difference is executed. By this routine, the deviation of the phase difference between the reference signal and the FG pulse from the target phase difference is corrected.

In the next step S12, based on this corrected deviation, the computer unit 2 computes the amount of adjustment. Then the operation adavnces to a step S13 in which tne computation result from the computer unit 2, that is, the amount of adjustment is outputted to the D/A converter 7. Thereby, the phase of rotation of the motor 9 is controlled on the basis of the amount of adjustment. Then the operation advances to a step S14 in which on the basis of the content of the latch circuit 4 read by the computer unit 2, whether or not the actual phase difference between the reference signal and the FG pulse has reached the target or ideal phase difference, that is, whether their phases are in synchronism, is tested. If out of synchronism, then the operatoin returns to the step S10 to repeat the procedure. If their phases are determined to be in synchronism, then the operation advances to a step S15 in which the computer unit 2 produces the READY signal 15 of H level. Then the operation returns to the step S10.

The essential part of the embodiment of the invention, or the rotator drive control circuit next is described in detail.

Figure 3B:
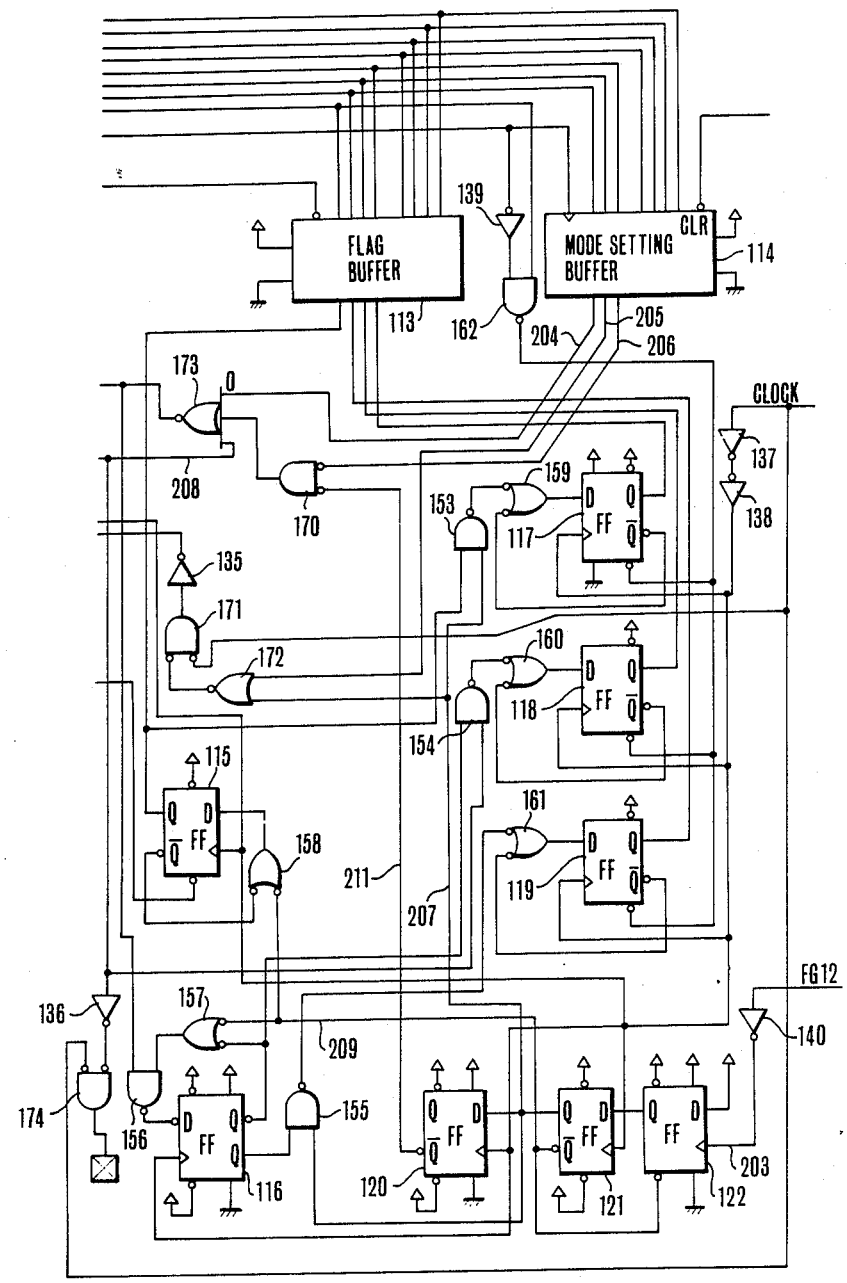

FIGS. 3, 3A and 3B illustrate the details of the construction and arrangement of the elements of the circuits 3, 4 and 6 and the switch 11 constituting the rotator drive circuit enclosed within a dot-and-dash line block in FIG. 1. Timer counters 107–110 perform counting of a clock signal 201 from initial values set by timer pre-scalers 105 and 106, constituting the counter circuit 3 of FIG. 1. Timer latches 111 and 112 responsive to a strobe signal 202 for holding the values of the timer counters 107–110, constitute the latch circuit 4 of FIG. 1. A flag buffer 113 latches the output of flip-flops (hereinafter abbreviated to FF) 117, 118, 119 and 115. A buffer 114 for setting modes controls the operation of the mode selection switch 11. An FF 112 operates with timing of a signal 203 obtained by inverting the FG signal 12. Another FF 121 latches the Q output of the FF 122 in the timing of the clock signal 231. Another FF 120 latches the Q output of the FF 121 in the timing of the clock signal 201. Another FF 116 latches the output of a NAND gate 156 in the timing of the clock signal 201. 130–140 are inverter gates; 150–162 are NAND gates; 170–174 are NOR gates. For note, the reference signal generating circuit 6 in this embodiment has the timer counters 107–110 in common.

A data bus buffer 101 and an address bus buffer 102 are connected to the CPU of the system control computer unit 2 through data buses and address buses respectively. Address decoders 103 and 104 are connected to the address buffer 102. The CPU supplies a chip select signal $\overline{CS}$, a read signal $\overline{RD}$, a write signal $\overline{WR}$ and an address line signal $\overline{AWR}$ for activating the address bus buffer 102.

The operation of the circuit of FIGS. 3, 3A and 3B is described below.

At first, the device is assumed to be sat in the phase control mode by mode select signals 204, 205 and 206 of which the first two have L level and tne last has H level. At this time, the target period of the FG is set in the pre-scalers 105 and 106 by the complement-of-2 representation of the multiplied period of the clock signal 201 by an integer. Then, after the FG signal 203 has risen, when the signal 207 which is synchronized with the clock signal 201 through the flip-flops 121 and 122 rises up, the signal 202 becomes L level, causing the the values of the timer counters 107–110 to be latched in the timer latches 111 and 112. At the same time, by the signal 209 which is the inversion of the signal 207, the output of FF 115 is changed to H level. Also, by the overflow signal of the timer counter 107–110, the output of the gate 173 is changed to L level at which the counters 107–110 start to count again from the values set in the pre-scalers 105 and 106. That is, the measured value of time frcm the start of the re-counting of the timer counters 107–110 to the moment at which the FG signal 203 rises up is stored in the timer latches 111 and 112. That is, the phase control is carried out by controlling the phase of rotation of the motor 9 so as to bring this value to constant.

By the way, the fact that the data have been latched in the timer latches 111 and 112 can be sensed in the form of a change of the Q output of the FF 115 to H level as has been described above. But, at this time, it is considered that before the contents of the latches 111 and 112 are read out, the next FG signal 203 rises up. The FF 115 is cleared by the READ strobe signal 210 of the timer latch 112. But, if the FG signal 203 rises up before the READ strobe signal 210 becomes L level, the output of the NAND gate 153 oecomes L level and the Q output of the FF 117 becomes H level. That is, referring to the through the data bus content of the flag buffer 113 corresponding to this signal when, for example, in the steps S10–S15 of the phase control process, the CPU of the computer unit 2 can detect the fact that the FG signal 203 has risen up twice or more during the time until the contents of the timer latches 111 and 112 are read in.

In general, when the microcomputer or the like is applied to the computation for the phase control, an event sometimes occurs that the computation occurs too late. For this case, the normal procedure of computing operations may partly be skipped with the essential operations being retained, so that the computing is not too late for the timing with the next FG pulse. Even if the computing for the phase control is skipped, for example, one out of several times, the phase of the motor 9 is not largely disturbed. So, in such a case, the only treatment may be limited to the resetting of the FF 117, that is, the changing of the input of the gate 139 to L level, which is followed by waiting for latching of the next data.

Next, an alternative case is considered in which the FG signal 203 has not even once risen up in the time interval from the moment at which, as the timer counters 107–110 overflowed, the re-counting was started to the moment at which they have overflowed for the next time.

At first. when the timer counters 107–110 overflow, the output of the NAND gate 156 becomes H level. Therefore, the Q output of FF 116 has H level. In this state, when the FG signal 203 rises up to change the signal 209 to L level, if the timer counters 107–110 do not overflow yet, the output of the NAND gate 156 becomes L level, and the output Q of the FF 116 becomes L level. But, if the overflow signal 208 of the timer counters 107–110 becomes H level again before the FG signal 203 rises up, because both inputs of the NAND gate 154 become H level, the Q output of FF 118 is set to H level.

This allows for the CPU of the computer unit 2 to be able, upon reference to the corresponding content of the flag buffer 113 corresponding to this signal when, for example, in the phase control process, to detect the fact that no rising up of the FG signal occurs during the time between after the timer counter 107–110 overflowed and before they have overflowed for the next time.

Though such a situation may be taken as an abnormal operation to stop the motor, it is fairly considered that the subsequent phase control is necessary. For this case, the input of the gate 139 is first changed to L level to reset the FF 118. Then, based on the reference to the state of the signal of the flag buffer 113 as has been described above, or using this as an interrupt signal, transition to the speed control mode is made. At a time when the speed has become stable, transition to the phase control mode again is then made.

For the speed control mode, the mode select signals 204–206 are all set to L level, and zero is set in the pre-scaler. Then, in a slight delay from the rising up of the FG signal 203, the signal 207 rises up, causing change of the signal 202 to L level at which time the values of the timer counters 107–110 are stored in the timer latches 111 and 112, and also causing change of the signal 211 to L level and change of the output of the gate 173 to L level, at which time the counters 107–110 load the values of the pre-scalers, that is, are reset to zero and start to count again. Since the concurrent values of the timer latches 111 and 112 represent the period of the FG signal, the speed may be controlled in accordance with this value.

Next, ar alternative case is considered in which the FG signal 203 has twice or more risen up during the time between after, as the timer counters 107–110 overflowed, the re-counting was started and before the next overflowing has occurred.

At first, when the timer counters 107–110 overflow, the output of the NAND gate 156 becomes H level. Therefore, the Q output of the FF 116 becomes H level, and its $\overline{Q}$ output becomes L level. In this state, when the FG signal 203 rises up to change the signal 209 to L level, because, at this time, the timer counters 107–110 do not overflow yet, the output of the NAND gate 156 becomes L level, the Q output of the FF 116 becomes L level, and its $\overline{Q}$ output becomes H level. If, here, the counters 107–110 overflow, the outputs of the NAND gate 156 becomes H level, the Q output of the FF 116 becomes H level, and its $\overline{Q}$ output becomes L level. But, if the FG signal 203 once more rises up before the overflowing occurs, the output of the NAND gate 155 becomes L level, and the Q output of the FF 119 becomes H level.

This allows for the CPU of the computer unit 2 to be able, upon reference to the corresponding content of the flag buffer 113 through the data buses when, for example, in the course of controlling the phase, to detect the fact that the FG signal 203 has twice or more risen up between the successive two occurrences of the overflowing of the the timer counters 107–110.

Even in this case, similarly to the foregoing case, the motor 9 may be stopped. But, when the subsequent phase control is necessary, the FF 119 is first reset by changing the input of the gate 139 to L level. Then, as has been described above, based on the reference to the signal state cf the flag buffer 113, or by using this as the interrupt signal, the operation is routed to the speed control mode. After a good stability. of the speed is attained, the device is switched again to the phase control mode.

Figure 5:
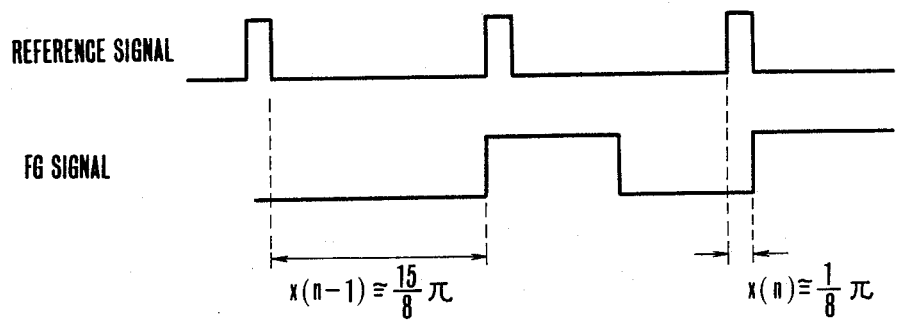

In such a manner, even when the FG pulse has deviated from the reference signal by more than $2\pi$, that is, such a situation as shown in FIG. 5 is encountered, without making an erroneous control, the phase difference between them can be made to quickly, reliably and stably fall within the range of 0 to $2\pi$.

For note, in the embodiment of the invention, since the phase control is carried out by using the FG pulses (for example, 16 pulses per one revolution of the motor), as compared with the PG pulse (one pulse per one revolution of the motor), a more accurate phase synchronization is possible. After the phase synchronization, by the step S15 the READY signal 15 of H level is produced. Responsive to this, the one-shot circuit 20 produces a pulse which is longer than the period of the reference signal 17 but shorter than 2 times the period. And, since, as the motor is rotating, the PG 19 produces the signal 18 of H level once for each revolution at a particular phase, when the output of the one-shot circuit 20 has become H level, or the READY signal 15 has changed to H level representing that the phases have been synchronized with each other and the output signal 18 of the PG 19 changes to H level, the output of the AND gate 21 becomes H level to set the system reference signal generating circuit 5.

Therefore, the timing of the video signal processing system including the image pickup system of the electronic still camera can be quickly obtained by this system reference signal generating circuit 5. Moreover, at this time, the recording medium 25 and the reference signal generating circuit 5 are in perfect synchronism.

In such a manner, according to the embodiment of the invention, at the start of energization of the motor, the phase control based on the synchronizing signal is not carried out but only the speed control is carried out, thereby the influence of the phase error signal is not received. Therefore, the time until the speed is stabilized is short. Also, according to this embodiment, after the speed of the motor has become stable, the motor control is changed over from the speed control to the phase control. Moreover, the phase of the reference signal for this phase control is at first brought into coincidence with the phase of the motor, thereby it being made possible to minimize the variation of the phase of the motor at the time of changing over to the phase control mode so that the synchronization of their phases is established in a reduced time. Moreover, a synchronization of the thus-phase synchronized motor with the video signal can also be obtained quickly.

For note, though the embodiment of the invention has been described in connection with the use of the FG pulse in the control on assumption that the FG pulse is capable of deviating $2\pi$ or more to the reference signal, that is, as shown in FIG. 5, the present invention is applicable to the system using PG pulses in the control even on the same assumption, provided the value of the pre-scaler is altered to suit it.

Also, though the embodiment of the invention has been described as applied to the electronic still camera, it is of course possible to apply the invention to other various instruments having the drive mechanism for the rotator with great advantages and very easily.

What is claimed is:

1. A rotator drive device comprising:
   (A) rotation drive means for driving a rotator;
   (B) pulse generating means for generating pulses in response to rotation of said rotator;
   (C) a reference signal source for forming a periodic reference signal;
   (D) phase control means arranged to compare a difference in phase between an output of said reference signal source and an output of said pulse generating means with a prescribed value and to control said rotation drive means so as to reduce a difference therebetween; and
   (E) detecting means for reading out said phase difference in response to the production of an output of said pulse generating means and detecting if the generating of another output of said pulse generating means has occurred before said reading out operation terminates.

2. A device according to claim 1, wherein said phase control means is arranged to change timing of the operation of comparing the difference in phase between the output of said reference signal source and the output of said pulse generating means with said predetermined value, in accordance with an output of detection of said detecting means.

3. A device according to claim 2, wherein said phase control means responsive to detection of the fact that said pulse generating means has generated another output before said operation of reading out said phase difference terminates by said detecting means, interrupts the reading of the information concerning the present phase difference and detects the next phase difference information.

4. A device according to claim 1, wherein said phase control means starts to detect the phase difference between said reference and output of said pulse generating means each time the output of said pulse generating means is generated, and produces a control.

5. A device according to claim 1, wherein said phase control means includes:
   (A) control means which is preset each time said reference signal is inputted and counts a clock signal; and
   (B) latch means for latching the counted value just before the presetting of said counter means each time the output of said pulse generating means is inputted, and said phase control means is arranged to compare the difference between said counted value and said prescribed value and control said rotation drive means so as to reduce the difference between said counted value and said prescribed value.

6. A device according to claim 5, wherein said detecting means detects the fact that, before the reading of the counted value of said counter means which was latched responsive to a pulse of said pulse generating means has been completed, the next pulse of said pulse generating means is inputted, and said phase control means responsive to detection of said fact interrupts the reading output of said counted value.

7. A device according to claim 1 wherein said constant phase difference is $\pi$.

8. A rotator drive device comprising:
   (A) rotation drive means for driving a rotator;
   (B) pulse generating means for generating pulses in response to rotation of said rotator;
   (C) a reference signal source for forming a periodic reference signal;
   (D) phase control means arranged to compare and compute a difference in phase between an output of said reference signal source and an output of said pulse generating means with a prescribed value and to control said rotation drive means so as to reduce a difference therebetween; and
   (E) control means for changing the algorithm of comparing operation of said phase control means depending on the time interval between after said pulse generating means has generated an output and before said pulse generating means produces another output.

9. A device according to claim 8, wherein said phase control means starts to compute the phase difference between said reference signal and the output of said pulse generating means each time said output of said pulse generating means is generated, and produces the control value according to said phase difference.

10. A device according to claim 8 or 9, wherein said control means reads out said phase difference after the generation of an output of said pulse generating means has occured, and, if the generating of another output said pulse generating means has occured before this reading operation terminates, causes said phase control means to interrupt the present cycle of computation of said phase difference and to perform the next cycle of computation of said phase difference.

11. A device according to claim 9 wherein said phase control means includes:
(A) counter means which is preset each time said reference signal in inputted, and counts a clock signal; and
(B) latch means for latching the counted value just before the presetting of said counter means each time said output of said pulse generating means is inputted;
said phase control means being arranged to compare said counted value latched in said latching means with a prescribed value and to control said rotation drive means so as to reduce a difference therebetween.

12. A device according to claim 11, wherein said control means responsive to detection of the fact that, before the reading out of the counted value of said counter means which is latched responsive to a pulse of said pulse generating means is completed, the next pulse of said pulse generating means has been inputted, causes said phase control means to interrupt the reading out of said counted value.

13. A device according to claim 9 or 12, wherein said said prescribed value is $\pi$.

14. A rotator drive device comprising:
(A) rotation drive means for driving a rotator;
(B) pulse generating means for generating pulses in response to rotation of said rotator;
(C) a reference signal source for forming a periodic reference signal;
(D) phase control means arranged to compare a phase difference between said reference signal and an output of said pulse generating means with a prescribed value and to control said rotation drive means in such a manner that said difference becomes equal to said prescribed value; and
(E) detecting means for detecting a fact that said pulse generating means has no output in one period of said reference signal.

15. A device according to claim 14, further comprising speed control means for controlling speed of said rotator in such a manner that the speed of said rotator is detected, then this is compared with a prescribed target value to detect a speed deviation, and then said rotation drive means is controlled in accordance with said speed deviation.

16. A device according to claim 15, further comprising control means for selecting either one of said phase control means and said speed control means to operate depending on the state of said rotator.

17. A device according to claim 16, wherein said control means responsive to detection of the fact that said pulse generating means has produced no output in one period of said reference signal by said control means selects said reference signal by said control the speed of said rotation drive means, and, after the speed of said rotator being stable, changes it over to said phase control means.

18. A device according to claim 16, wherein said control means responsive to start of motion of said rotator selects said speed control means to control the speed, and responsive to stabilization of the speed of said rotator changes it over to said phase control means to control the phase.

19. A device according to claim 16, wherein said phase control means includes:

(A) counter means which is preset each time said refernece signal is inputted, and counts a clock signal; and
(B) latch means for latching the counted value just before the presetting of said counter means each time said output of said pulse generating means is inputted,
and said phase control means is arranged to compare said counted value with said prescribed value and to control said rotation drive means in such a manner that said counted value between equal to said prescribe value.

20. A device according to claim 19, wherein said speed control means includes:
(A) counter means for counting a clock signal which means is preset each time the output of said pulse generating means is inputted; and
(B) latch means for latching the counted value just before the presetting of said counter means each time the output of said pulse generating means is inputted, wherein said rotator drive means is controlled in such a manner that said counted value latched in said latch means is compared with a prescribed value and said counted value becomes equal to said prescribed value.

21. A device according to claim 20, wherein said speed control means is constructed by supplying the output signal of said pulse generating means instead of the reference signal for presetting the counter means included in said phase control means, and said control means changes over the control modes by selectively connecting said reference signal and the output signal of said pulse generating means to said counter means.

22. A rotator drive device comprising:
(A) rotation drive means for driving a rotator;
(B) phase generating means for generating pulses in response to rotation of said rotator;
(C) reference signal source for forming a periodic reference signal;
(D) phase control means arranged to compare a difference in phase between said reference signal and an output of said pulse generating means with a prescribed value and to control said rotation drive means in such a manner as said phase difference becomes equal to said prescribed value; and
(E) detecting means for detecting an output of said pulse generating means a plurality of times in one period of said reference signal.

23. A device according to claim 22, further comprising speed control means for controlling the speed of said rotator in such a manner that the speed of said rotator is detected, then this is compared with a prescribed target value to detect a speed deviation, and said rotation drive means is controlled in accordance with said speed deviation.

24. A device according to claim 23, further comprising control means for selecting said phase control means and said speed control means to operate depending the state of said rotator.

25. A device according to claim 24, wherein said control means responsive to the output of said detecting means which represents that the generation of an output of said pulse generating means has repeated a plurality of times in one period of said reference signal selects said speed control means to control the speed of said rotator drive means, and responsive to stabilization of the speed of said rotator, changes it over to said phase control means.

26. A device according to claim 24, wherein said control means responsive to start of motion of said rotator selects said speed control means to perform the speed control, and responsive to stabilization of the speed of said rotator, changes it over to said phase control means to perform the phase control.

27. A device according to claim 24, wherein said phase control means includes:
(A) counter means which is present each time said reference signal is inputted, and counts a clock signal; and
(B) latching means for latching the counted value just before the presetting of said counter means each time said output of said pulse generating means is inputted, and
said phase control means is arranged to compare said counted value latched in said latching means with said prescribed value and to control said rotation drive means in such a manner that said counted value becomes equal to said prescribed value.

28. A device according to claim 27, wherein said speed control means includes:
(A) counter means which is present each time said pulse generating means produces an output signal and counts a clock signal; and
(B) latching means for latching the counted value just before the presetting of said counter means each time said pulse generating means produces an output signal;
and said speed control means is arranged to control said drive means in such a manner that said counted value latched in siad latching means is compared with a prescribed value and said counted value becomes equal to said prescribed value.

29. A device according to claim 28, wherein said speed control means is constructed by supplying the output signal of said pulse generating means instead of said reference signal for presetting said counter means included in said phase control means, and said control means changes over the control modes by selectively connecting said reference signal and the output signal of said pulse generating means to said counter means.

30. A recording and/or reproducing apparatus comprising:
(A) rotation drive means for driving a rotator mounting a recording medium thereon;
(B) pulse generating means for generating pulses in response to rotation of said rotation of said rotator;
(C) a reference signal source for forming a periodic reference signal;
(D) phase control means arranged to compare and compute a phase difference between an output of said reference signal source and an output of said phase generating means with prescribed value and to control said rotation drive means so as to reduce a difference therebetween;
(E) speed control means for controlling the speed of said rotator in such a manner that the speed of said rotator is detected, then this is compared with a prescribed target value to detect a speed deviation, and said rotation drive means is controlled in accordance with said speed deviation; and
(F) control means causing said speed control means to control the speed of said rotator when the result of computation of the phase difference comparison with said prescribed value is not in a prescribed range, and causing said phase control means to control the phase of said rotator when the result of computation of the phase difference in comparison with said prescribed value.

31. A apparatus according to claim 30, wherein said prescribed range is $\pm\pi$.

32. An apparatus according to claim 30, wherein said phase control means includes:
(A) counter means which is preset each time said reference signal is inputted, and counts a clock signal; and
(B) latching means for latching the counted value just before the presetting of said counter means each time said output of said pulse generating means is inputted,
and said phase control is arranged to compare said counted value and said prescribed vaule and to control said rotation drive means in such a manner that a difference between said counted value and said prescribed value is reduced.

33. An apparatus according to claim 32, wherein said speed control means includes:
(A) counter means which is preset each time said pulse generating means produces an output signal, and counts a clock signal; and
(B) latching means for latching the counted value just before the presetting of said counter means each time said pulse generating means produces and output signal,
and said speed control means is arranged to compare said counted value latched in said latching means with a prescribed value and to control said rotation drive means in such a manner that said control value becomes equal to said prescribed value.

34. A device according to claim 33, wherein said speed control means is constructed by supplying the output signal of said pulse generating means instead of said reference signal for presetting said counter means included in said phase control means, and said control means changes over the control modes by selectively connecting said reference signal and the output signal of said pulse generating means to said counter means.

35. A picture recording device comprising:
(A) drive means for driving a recording medium;
(B) phase detecting means for detecting the phase of driving of said recording medium;
(C) a reference signal source for forming a periodic reference signal;
(D) pulse generating means for generating pulses in repsonse to driving operation of said recording medium;
(E) pulse control means arranged to control said drive means in such a manner that a phase difference between said reference signal and an output of said pulse generating means becomes a constant value; and
(F) control means for varying the number of cycles of operation of said phase control means depending on the time interval between after said pulse generating phase detecting means has produced and output and before said phase detecting means produces another output.

36. A device according to claim 35, further comprising: a system reference signal generating circuit for producing a timing of a video signal processing system according to an output of said phase detecting means.

37. A device according to claim 36, wherein said phase control means repsonsive to establishment of the synchronism between the phases of the output of said pulse generating means and said reference signal produces a control signal having a duration longer than a vertical synchronizing time and shorter than two times thereof which is applied to said system reference signal generating circuit, wherein said system reference signal generating circuit is set on the basis of said control signal.

38. A device according to claim 37, wherein said driving means is a driving motor for rotating said recording medium, said device further including means for producing a signal which functions as a reference for the phase of rotation at a time when said recording medium or said rotation drive means takes a particular phase of rotation in one revolution thereof, and said system reference signal generating circuit is set in such a timing that said signal and said control signal both are inputted.

39. A device according to claim 38, wherein said system reference signal generating circuit includes a vertical synchronizing signal generating circuit.

40. A device according to any one of claims 1-4, 5 and 6, wherein said rotator is a disc-shaped recording medium and said rotation drive means is a motor for driving said disc-shaped recording medium.

41. A device according to any one of claim 8, 9, 11 or 14, wherein said rotator is a disc-shaped recording medium and said rotation drive means is a motor for driving said disc-shaped recording medium.

42. A device according to claim 10, wherein said rotator is a disc-shaped recording medium and said rotation drive means is a motor for driving said disc-shaped recording medium.

43. A device according to claim 13, wherein said rotator is a disc-shaped recording medium and said rotation drive means is a motor for driving said disc-shaped recording medium.

* * * * *

UNITED STATES PATENT AND TRADEMARK OFFICE
CERTIFICATE OF CORRECTION

PATENT NO. : 4,933,985

DATED : June 12, 1990

INVENTOR(S) : Nobuo Fukushima

It is certified that error appears in the above-identified patent and that said Letters Patent is hereby corrected as shown below:

Col. 1, line 16, change "camera whole." to -- camera as a whole. --

Col. 1, line 29, delete "that"

Col. 1, line 41, change "hecause" to -- because --

Col. 1, line 63, change "diffar" to -- differ --

Col. 2, line 35, change "phaee" to -- phase --

Col. 2, line 49, change "is met," to -- occurs, --

Col. 2, line 50, after "additionally" insert -- using --

Col. 2, line 56, change "furthermore" -- further --

Col. 2, line 61, change "is occurs" to -- occurs --

Col. 3, line 2, change "rctation" to -- rotation --

Col. 3, line 40, after "switch 1" insert -- and --

Col. 3, line 41, change "device whole" to -- device as a whole --

Col. 3, line 43, change "microcon:puter" to -- microcomputer --

Col. 3, line 63, change "Frequency Generator)" to -- (Frequency Generator) --

Col. 4, line 38, change "resolution" to -- revolution --

Col. 4, line 62, change "ini&ial" to -- initial --

Col. 5, line 31, change "computar" to -- computer --

Col. 5, line 63, change "operatoin" to -- operation --

Col. 6, line 2, change "next is" to -- is next --

Col. 6, line 20, change "231" to -- 201 --

UNITED STATES PATENT AND TRADEMARK OFFICE
CERTIFICATE OF CORRECTION

PATENT NO. : 4,933,985

DATED : June 12, 1990

INVENTOR(S) : Nobuo Fukushima

It is certified that error appears in the above-identified patent and that said Letters Patent is hereby corrected as shown below:

Col. 6, line 56, change "frcm" to -- from --
Col. 7, line 3, change "occomes" to -- becomes --
Col. 7, line 5, delete "to the" and insert after "bus" -- to the --
Col. 7, line 45, delete "corresponding"
Col. 8, line 15, change "cutput" to -- output --
Col. 8, line 41, change "cf" to -- of --
Col. 9, line 16, change "becone" to -- become --
Col. 10, line 10, after "control" insert -- value according to said phase difference --
Col. 10, line 63, after "output" insert -- of --
Col. 10, line 56, change "said reference signal" to -- selects said speed control means --
Col. 13, line 32, change "siad" to -- said --

Signed and Sealed this

Seventeenth Day of December, 1991

*Attest:*

HARRY F. MANBECK, JR.

*Attesting Officer*     *Commissioner of Patents and Trademarks*